(12) United States Patent
Powers et al.

(10) Patent No.: US 11,606,147 B1
(45) Date of Patent: Mar. 14, 2023

(54) FREQUENCY AND BANDWIDTH AGILE OPTICAL BENCH

(71) Applicant: BAE Systems Information and Electronic Systems Integration Inc., Nashua, NH (US)

(72) Inventors: Michael J. Powers, Amherst, NH (US); Robert Carlson, Bedford, NH (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 17/832,841

(22) Filed: Jun. 6, 2022

(51) Int. Cl.
H04B 10/50 (2013.01)
H04B 10/61 (2013.01)

(52) U.S. Cl.
CPC ......... H04B 10/503 (2013.01); H04B 10/614 (2013.01); H04B 10/615 (2013.01)

(58) Field of Classification Search
CPC ... H04B 10/503; H04B 10/614; H04B 10/615
USPC .......................................................... 398/149
See application file for complete search history.

(56) References Cited

U.S. PATENT DOCUMENTS

| | | | | |
|---|---|---|---|---|
| 6,043,922 A * | 3/2000 | Koga | ..................... | H04B 10/69 398/1 |
| 6,345,059 B1 * | 2/2002 | Flanders | ................. | H01S 5/141 372/98 |
| 6,813,420 B1 * | 11/2004 | Korn | .................. | G02B 6/29361 385/33 |
| 7,519,096 B2 * | 4/2009 | Bouma | ................ | A61B 5/0066 372/15 |
| 7,565,084 B1 * | 7/2009 | Wach | ...................... | H04J 14/04 398/201 |
| 7,826,055 B2 * | 11/2010 | Scobey | ...................... | G01J 3/32 356/418 |
| 7,961,369 B2 | 6/2011 | Khoshnevisan et al. | | |
| 8,861,106 B2 | 10/2014 | Moore et al. | | |
| 9,239,443 B2 * | 1/2016 | Belgum | ................. | G02B 7/006 |
| 9,488,827 B2 * | 11/2016 | Fukuyo | ..................... | G01J 3/12 |
| 9,835,847 B2 | 12/2017 | Saari et al. | | |
| 11,397,075 B2 * | 7/2022 | Swanson | ............ | G01B 9/02091 |
| 2007/0127926 A1 * | 6/2007 | Marioni | ............ | H04B 10/1121 398/118 |
| 2011/0051143 A1 * | 3/2011 | Flanders | ............... | H01S 5/5018 359/337.2 |

FOREIGN PATENT DOCUMENTS

| | | | | |
|---|---|---|---|---|
| CA | 2206945 A1 * | 12/1997 | ............. | H04B 10/69 |
| CA | 2781824 A1 * | 6/2011 | ......... | G01N 21/6428 |
| CN | 107257285 A * | 10/2017 | ........... | H04L 9/3278 |

(Continued)

Primary Examiner — Abbas H Alagheband
(74) Attorney, Agent, or Firm — Sand, Sebolt & Wernow LPA; Gary McFaline

(57) ABSTRACT

An optical bench utilizing narrowband optical filters on precision rotary stages that can provide custom tuning of the operational frequencies of the optical bench while maintaining the ability to switch between narrowband and wideband operation thereof. The precision rotary filters may further provide dynamic reconfiguration of the optical bench to alternate frequencies for intersystem compatibility, the enablement of additional self-test capabilities, and easing the manufacturing tolerances thereof.

15 Claims, 5 Drawing Sheets

(56) References Cited

FOREIGN PATENT DOCUMENTS

| | | | | |
|---|---|---|---|---|
| EP | 0762688 | A2 | 12/1997 | |
| EP | 3588025 | B1 | 8/2021 | |
| JP | 2004187716 | A * | 7/2004 | |
| TW | 200428130 | A * | 12/2004 | ........... H04N 9/3105 |
| WO | 2005001401 | A2 | 1/2005 | |
| WO | WO-2019099096 | A1 * | 5/2019 | ............. G01F 1/661 |

\* cited by examiner

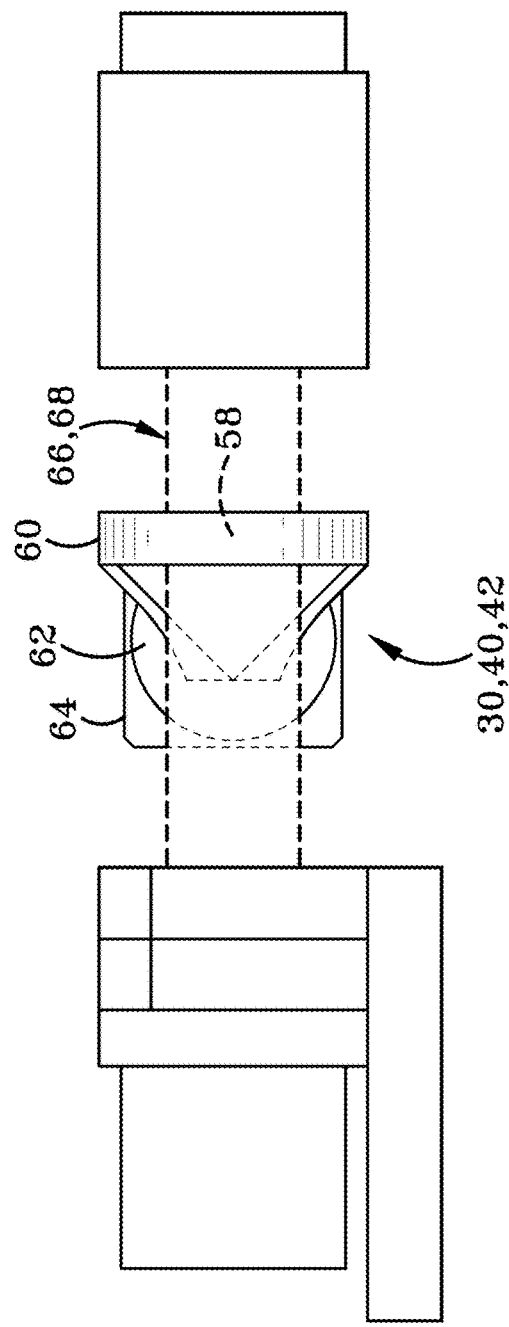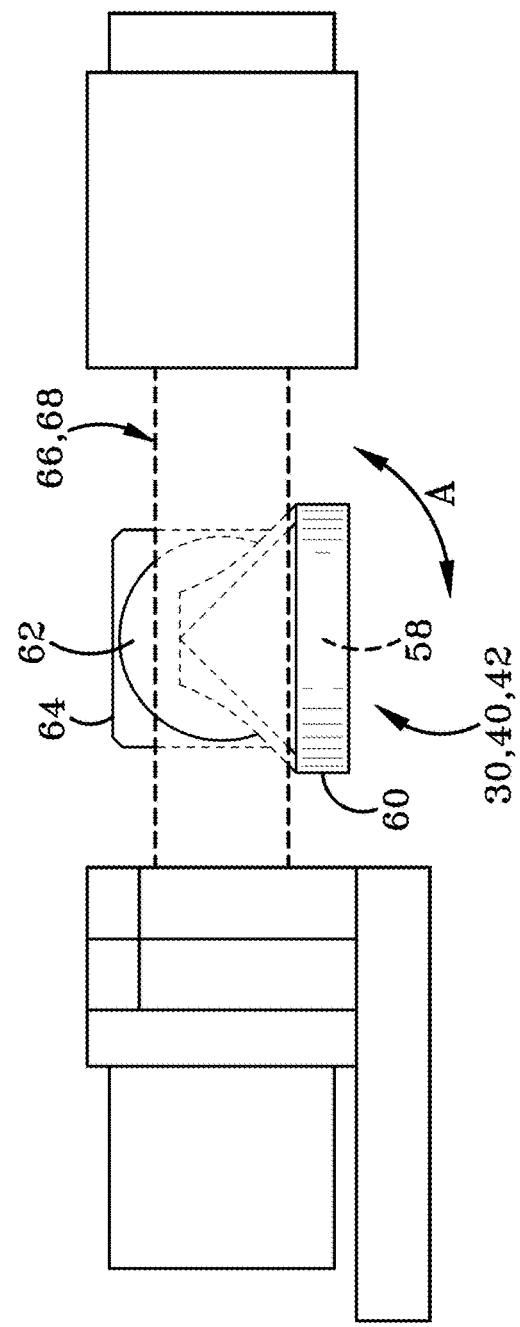

FREQUENCY AND BANDWIDTH AGILE OPTICAL BENCH

TECHNICAL FIELD

The present disclosure relates generally to wireless communications systems. More particularly, in one example, the present disclosure relates to optical benches for use in optical based wireless communications systems.

BACKGROUND

As communication technologies advance, there is a continuous need for improved high-speed, reliable, secure, wireless communications and wireless data transmission of large amounts of information. Traditionally, wireless communication and data transmission (referred to herein collectively as communication) typically utilizes the transmission of radio frequency (RF) signals utilizing one or more antennas and/or arrays to transmit communications over distance. Traditional RF communications, however, suffer from rapid signal attenuation over distance as well as signal disbursement over large geographical areas. Additionally, RF signals are relatively easy to intercept by unintended receivers, whether intentionally or accidentally, due to geographic overlap of RF communication signals.

An alternative to RF communications is the use of optical and/or laser communications, which are better suited to long distance communication as the signals do not degrade over distance nor do they disburse over large areas. Typically, such systems utilize optical benches having narrowband optical filters at fixed frequencies for specific applications. In wireless applications where filtering must be done in free space, having fixed filters can allow for filtering and multiplexing of an optical signal; however, it is limited by the frequencies of the intended application.

In applications utilizing spatial receiver sensors, such as focal planes or quad cell detectors, where the optical bench is used to detect and/or track signals, these fixed filters can limit the proper operation thereof. One solution previously employed utilizes a flipper mechanism allowing the optical bench to switch between a wideband operation and a narrowband operation by moving filters into or out of the optical path. This allows the systems to be more flexible and operate in alternate frequencies; however, the flipper mechanism provides that the filter is always in the optical path or out of the optical path but does not allow for fine tuning of the filtering of the optical signal.

SUMMARY

The present disclosure addresses these and other issues by providing an optical bench utilizing narrowband optical filters on precision rotary stages that can provide custom tuning of the operational frequencies of the optical bench while maintaining the ability to switch between narrowband and wideband operation thereof. The precision rotary filters may further provide dynamic reconfiguration of the optical bench to alternate frequencies for intersystem compatibility, the enablement of additional self-test capabilities, and easing the manufacturing tolerances thereof.

In one aspect, an exemplary embodiment of the present disclosure may provide a laser communications optical bench comprising: at least one generator operable to generate an optical communications transmission beam at a first frequency along a transmission pathway; a rotation mechanism; and a filter carried by the rotation mechanism; wherein the rotation mechanism is operable to rotate the filter to any desired position between a first position wherein the filter is substantially orthogonal to the transmission pathway and a second position wherein the filter is substantially parallel to and out of the transmission pathway, and wherein the filter is further operable to shift a center wavelength frequency of the transmission beam within a desired frequency band as it rotates between the first position and the second position. This exemplary embodiment or another exemplary embodiment may further provide wherein the transmission pathway of the optical bench operates in a narrowband mode when the filter is in any position within the transmission pathway and the transmission pathway of the optical bench operates in a wideband mode when the filter is in the second position and out of the transmission pathway. This exemplary embodiment or another exemplary embodiment may further provide at least one receiver operable to receive an optical communications receiver beam from outside of the optical bench along a receiver pathway; a second rotation mechanism; and a second filter carried by the second rotation mechanism within the receiver pathway; wherein the second rotation mechanism is operable to rotate the second filter to any desired position between a first position wherein the second filter is substantially orthogonal to the receiver pathway of the receiver beam and a second position wherein the second filter is substantially parallel to and out of the receiver pathway of the receiver beam, and wherein the second filter is further operable to shift a center wavelength frequency of the receiver beam within a desired frequency band as it rotates between the first position and the second position. This exemplary embodiment or another exemplary embodiment may further provide a third rotation mechanism; and a third filter carried by the third rotation mechanism within the receiver pathway; wherein the third rotation mechanism is operable to rotate the third filter between a first position wherein the third filter is orthogonal to the receiver pathway of the receiver beam and a second position wherein the third filter is parallel to and out of the receiver pathway of the receiver beam, and wherein the third filter is further operable to shift a center wavelength frequency of the receiver beam within a desired frequency band as it rotates between the first position and the second position. This exemplary embodiment or another exemplary embodiment may further provide wherein the rotation mechanism, the second rotation mechanism, and the third rotation mechanism each further comprise: a rotation motor and position encoder. This exemplary embodiment or another exemplary embodiment may further provide wherein the third filter further comprises: an etalon filter. This exemplary embodiment or another exemplary embodiment may further provide wherein the etalon filter is operable to reduce interference caused by a solar disc when the solar disc is within a field of view of the optical bench. This exemplary embodiment or another exemplary embodiment may further provide wherein the receiver pathway further comprises: a receiver communications pathway; and an acquisition and tracking sensor pathway. This exemplary embodiment or another exemplary embodiment may further provide at least one polarizing beam splitter operable to direct at least a portion of the receiver beam down the receiver communications pathway and at least another portion of the receiver beam down the acquisition and tracking pathway. This exemplary embodiment or another exemplary embodiment may further provide wherein the receiver pathway of the optical bench operates in a narrowband mode when the second filter is in the receiver pathway and the receiver pathway of the optical bench operates in a wideband mode when the second filter is in the second position and out of the receiver pathway.

In another aspect, an exemplary embodiment of the present disclosure may provide a method of tuning a laser communications optical beam comprising: generating an optical communications transmission beam from at least one beam generator; directing the transmission beam down a transmission pathway in an optical bench; rotating a filter to a first position wherein the filter is orthogonal to the transmission pathway; filtering the transmission beam with a filter to have a required center wavelength relative to a desired wavelength of the transmission beam; rotating the filter to a second position wherein the filter is parallel to and out of the transmission pathway and the transmission beam is not filtered; and operating the transmission pathway of the optical bench in a wideband mode when the filter is in the second position. This exemplary embodiment or another exemplary embodiment may further provide rotating the filter to a plurality of positions between the first position and the second position; and filtering the transmission beam with the filter to shift the center wavelength of the transmission beam across a frequency band as the filter rotates through each position of the plurality of positions between the first position and the second position. This exemplary embodiment or another exemplary embodiment may further provide receiving an optical communications receiver beam from outside of the optical bench along a receiver pathway; directing the receiver beam down the receiver pathway; rotating a second filter to a first position wherein the second filter is orthogonal to the receiver pathway; filtering the receiver beam with the second filter to have a required center wavelength relative to a desired wavelength of the receiver beam; rotating the second filter to a second position wherein the second filter is parallel to and out of the receiver pathway and the receiver beam is not filtered; and operating the receiver pathway of the optical bench in a wideband mode when the second filter is in the second position. This exemplary embodiment or another exemplary embodiment may further provide rotating the second filter to a plurality of positions between the first position and the second position; and filtering the receiver beam with the second filter to shift the center wavelength of the receiver beam across a frequency band as the second filter rotates through each position of the plurality of positions between the first position and the second position. This exemplary embodiment or another exemplary embodiment may further provide wherein rotating the filter in the transmission pathway and the rotating the second filter in the receiver pathway is accomplished via a first rotation motor and position encoder and a second rotation motor and position encoder, respectively. This exemplary embodiment or another exemplary embodiment may further provide rotating a third filter to a first position wherein the third filter is orthogonal to the receiver pathway; filtering the receiver beam with the third filter to reduce interference from a solar disc when the solar disc is in a field of view of the optical bench; and rotating the third filter to a second position wherein the third filter is parallel to and out of the receiver pathway and the receiver beam is not filtered by the third filter. This exemplary embodiment or another exemplary embodiment may further provide wherein rotating the third filter is accomplished via a third rotation motor and position encoder.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2B (FIG. 2B) is an operational view of an exemplary optical filter shown in a first position within the optical path, according to one aspect of the present disclosure.

FIG. 2C (FIG. 2C) is an overhead operational view of the exemplary optical filter from FIG. 2B shown in a second position rotated fully out of the optical path, according to one aspect of the present disclosure.

Similar numbers refer to similar parts throughout the drawings.

DETAILED DESCRIPTION

Figure 1:
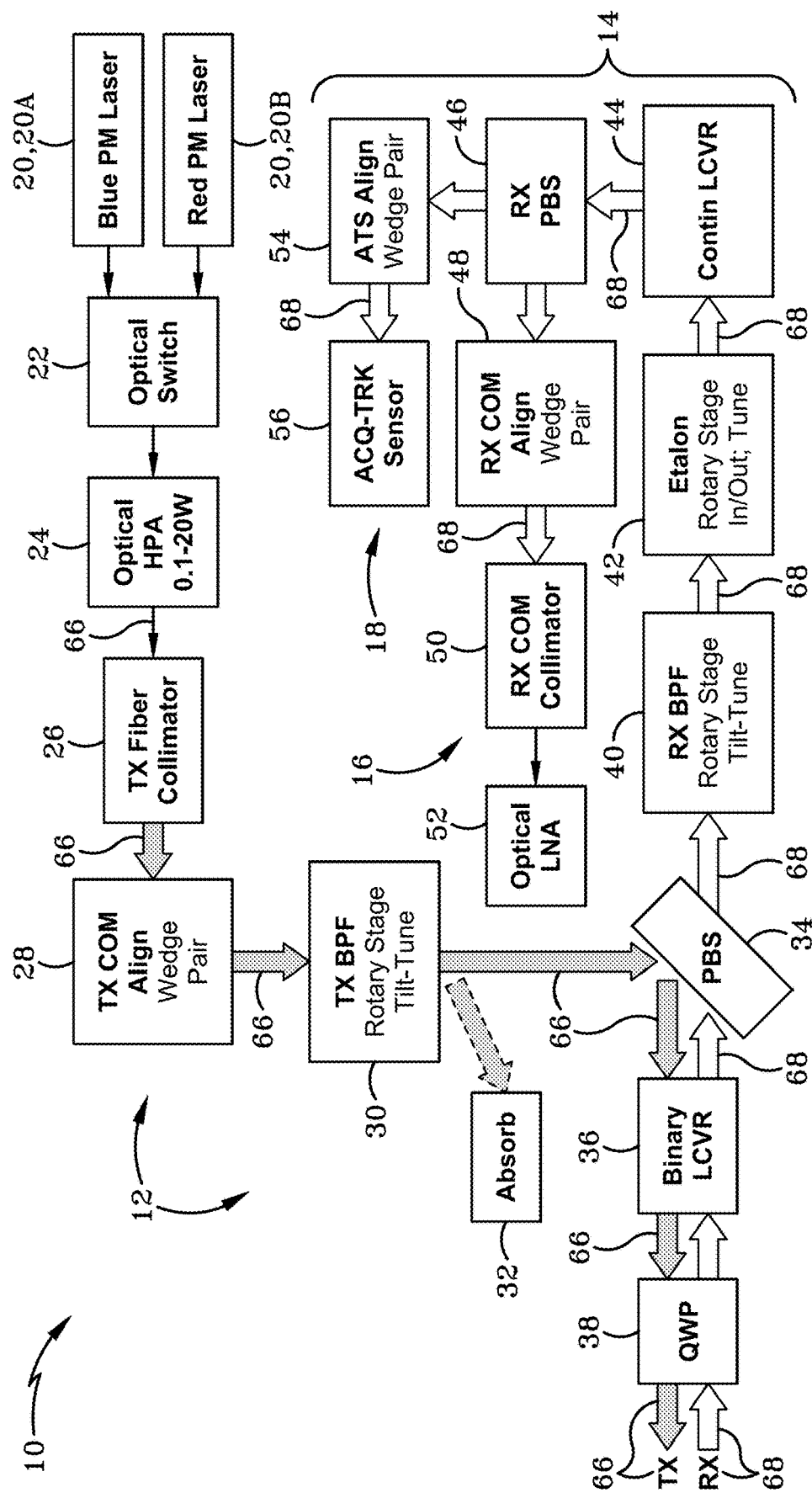
FIG. 1 (FIG. 1) is a representative optical bench block diagram of a next generation optical communications system, according to one aspect of the present disclosure.

With reference to FIG. 1, an exemplary laser communications optical bench block diagram is shown and generally indicated as optical bench 10. Optical bench 10, as discussed further herein, may include multiple optical and related elements and may be arranged in any suitable configuration. It will therefore be understood that the exemplary bench block diagram shown in FIG. 1 is a non-limiting example of an optical bench and not a limiting example thereof.

Optical bench 10 may generally be a laser communications optical system which may include a transmission pathway 12 and a receiver pathway 14. Generally speaking, the transmission pathway 12 may include multiple components as discussed below for generating and transmitting an optical signal such as a laser beam out of and away from optical bench 10. Receiver pathway 14 may likewise include additional components discussed further below and may generally be defined as the portion of optical bench 10 operable to receive a remote optical signal therein and process the same received signal. Receiver pathway 14 may be further split into a receiver communications path 16 and an acquisition and a tracking sensor (ATS) path 18.

With continued reference to FIG. 1, the transmission pathway 12 and receiver pathway 14 may include multiple optical components chosen according to the desired use and implementation of optical bench 10. According to the exemplary system shown and described herein, transmission pathway 12 may include one or more laser generators 20, one or more optical switches 22, one or more optical amplifiers 24, one or more collimators 26, one or more alignment and/or beam steering components such as an alignment wedge pair 28, one or more bandpass filters 30, and one or more absorbers 32. Both transmission pathway 12 and receiver pathway 14 may share components, as desired, such as one or more polarizing beam splitters (PBS) 34, one or more liquid crystal variable retarders (LCVR) 36, and other optical components, such as one or more quarter wave plates (QWP) 38. Receiver pathway 14 may further include one or more bandpass filters 40, one or more etalon filters 42, one or more continuous LCVRs 44, and one or more receiver PBSs 46. Receiver communications path 16, as a subset of receiver pathway 14, may further include one or more alignment and/or beam steering components such as an alignment wedge pair 48, one or more collimators 50, and one or more optical amplifiers 52. ATS path 18, as a second subset of receiver pathway 14, may likewise include one or more alignment and/or beam steering components such as an alignment wedge pair 54 and one or more acquisition and tracking sensors 56.

Laser generators 20 may be any suitable laser generator operable to generate and transmit an optical or laser signal over the C-band telecommunications wave range (e.g. 1530 nm to 1565 nm) and may include generators carried on or with optical bench 10 or may alternatively include remote generators operable to generate the optical laser and transmit the laser to optical bench 10 as dictated by the desired implementation. According to another aspect, laser generators 20 may be one or more tunable laser generators, which may be operable to generate low optical signals at multiple wavelengths over the desired wave range as dictated by the desired implementation.

As shown herein, laser generators 20 may include a first laser generator 20A and a second generator 20B, which may actually be or encompass any suitable wavelength in the C-band, but are shown herein as first "blue" laser generator 20A and second "red" laser generator 20B. The blue and red terms will be understood to be relative terms, with first laser generator 20A operable to generate a beam that is skewed to the blue side of the C-band spectrum and second laser generator 20B operable to generate a laser that is skewed to the red side of the C-band spectrum. Thus, as used herein, blue and red lasers are relative to each other. For example, first "blue" laser generator 20A may generate a beam at a wavelength of approximately 1550 nm while second "red" laser generator 20B may generate a beam at a wavelength of approximately 1555 nm. Thus, in this example, the second "red" beam generator 20B generates a beam that is skewed to the red side of the spectrum relative to the first "blue" laser generator 20B. Again, it will be understood that the laser generators 20 may be operable to generate a laser at any suitable wavelength, and may further or alternatively be tunable generators operable to generate beams at varying wavelength, as desired.

Optical switch 22 may be a standard and/or commercially available optical switch configurable to allow switching between a first laser from the first laser generator 20A (referred to herein as simply first laser 20A), and a second laser from the second laser generator 20B (referred to herein as second laser 20B). Where laser generators 20 are tunable, the use of an/or inclusion of optical switch 22 is optional as the generators 20 may be tuned to change the wavelength of the lasers. Alternatively, optical switch 22 may be further operable to combine first and second lasers 20A and 20B, as desired.

Optical amplifier 24 may be any suitable optical amplifier operable to amplify the optical signal up to a predetermined optical power. According to one example, optical amplifier may be a high powered amplifier operable to amplify the signal up to and including one tenth of a watt (0.1) to twenty (20) watts of amplification power.

Transmission fiber collimator 26 may be any suitable collimator operable to reconfigure the transmission or transmit beam (shown as beam 66 and discussed further below) to propagate through open air. According to one aspect, each of the laser generators 20, the optical switch 22, and the optical amplifier 24 may propagate the signal through fiber optic cables (shown as thin arrows in transmission pathway 12) to progress the transmission beam 66 through the transmission pathway 12, as discussed further below. The transmit fiber collimator 26 may then be operable to convert the transmission beam 66 from the signal carried on a cable to an open air optical signal (indicated by the thick arrows in transmission pathway 12), as dictated by the desired implementation. Put another way, transmit fiber collimator 26 may translate the beam 66 from the fiber optical cable to a light beam 66 operating in free space.

Transmission alignment wedge pair 28 may be standard optical wedges operable to steer or otherwise direct beam 66 within the optical bench 10. Wedge pair 28 may be aligned to steer the beam 66 from the collimator 26 to align the transmission path of the optical bench 10. Alternatively, wedge pair 28 may be or include any other suitable steering optical components operable to direct beam 66 within optical bench 10.

Figure 2A:
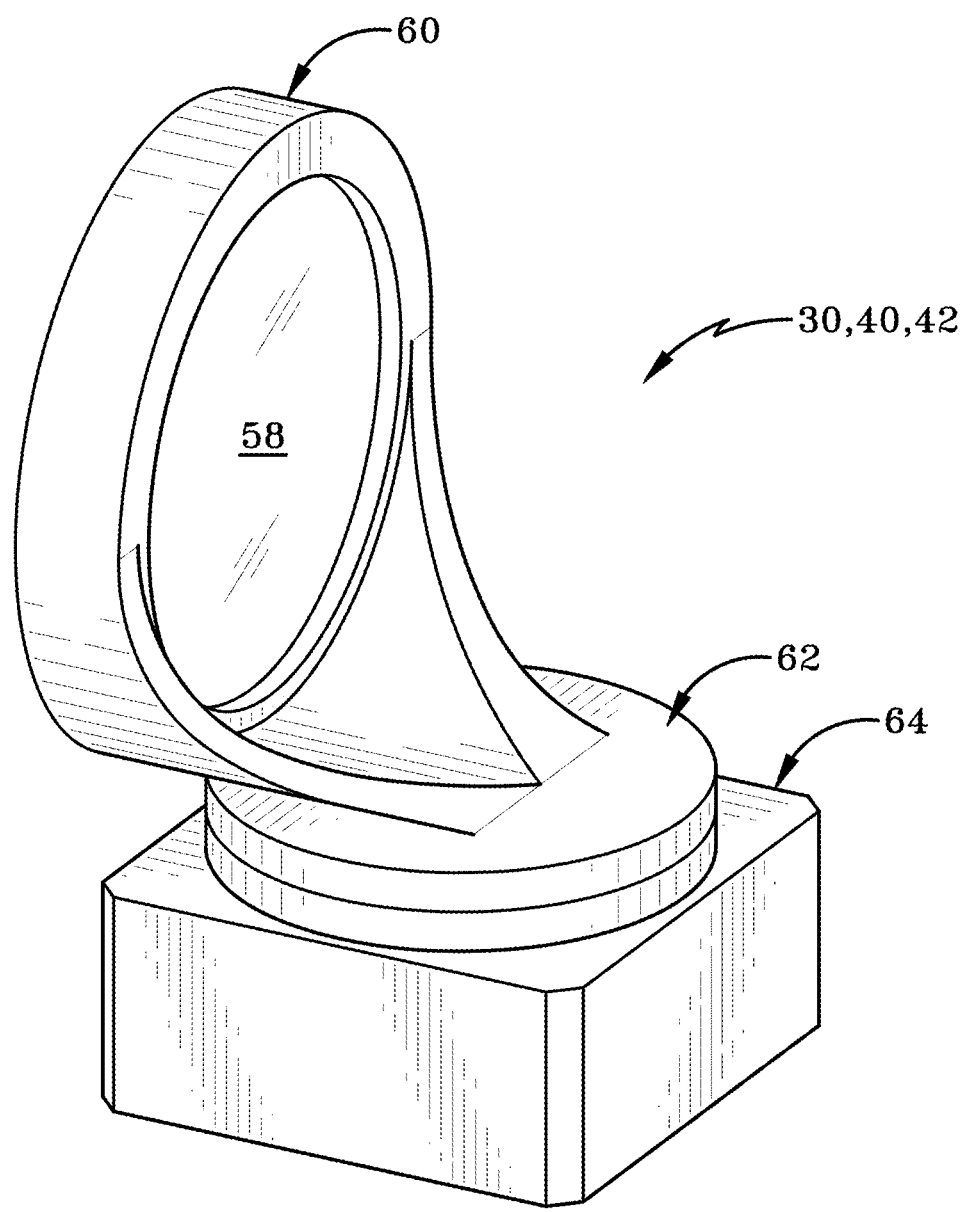
FIG. 2A (FIG. 2A) is an exemplary filter and rotary mount for use with an optical bench, according to one aspect of the present disclosure.

With reference to FIGS. 1 and 2A, transmit BPF 30, discussed in more detail below, may be operable to tune the filter passband to any wavelength within the desired transmission frequency band and to filter out any wavelength light that is not the desired or target wavelength for transmission beam 66. This may help prevent pollution of the receiver pathway 14 by errant light from the transmit pathway 12. The transmit BPF 30 may include a filter cell, such as filter cell 58 which may be carried or otherwise secured within a filter cell mount 60. As depicted herein, cell mount 60 and filter cell 58 may be generally circular; however, it will be understood that both components may have any suitable shape. As discussed in more detail below with regards to the operation thereof, transmit BPF 30 may be rotated to any angle between 0 and 90 degrees relative to the beam 66 path to tilt-tune the wavelength of the beam 66. When the transmit BPF 30 is rotated to 0 degrees (i.e. orthogonal to the beam path 66—see e.g. FIG. 2B), the beam 66 will have the exact required center wavelength relative to the desired transmission wavelength. When the transmit BPF 30 is rotated to 90 degrees (i.e. parallel to and entirely out of the beam path 66—see e.g. FIG. 2C), the transmit beam 66 will not be filtered and the transmit pathway 12 of the optical bench 10 will operate in the wideband frequency as generated from the laser generators 20. As discussed further below, rotating the transmit BPF 30 to angles between 0 and 90 degrees will effectively shift the center wavelength of the filter passband to other frequencies within the desired transmission frequency band for beam 66. According to one aspect, a smaller range of rotation may be used to tune the passband of the beam 66 for operation in the desired frequency band. For example, where the frequency band of interest is the C-band the angle of rotation may be 0-15 degrees for operational tuning, while 90 degrees may still be used to remove the transmit BPF 30 from the beam 66 path.

Transmit BPF 30 may further include a cell mount support plate 62, which may serve to connect the cell mount 60 and filter cell 58 to a rotation mechanism 64. Cell mount support plate 62 may simply be any suitable structure operable to support the filter cell 58 and cell mount 60 to the rotation mechanism 64 and can have any suitable shape and/or configuration, and may be formed as an integral part with cell mount 60, or as a separate piece operable to connect thereto.

Rotation mechanism 64 may be any suitable rotary stage device operable to support the filter cell 58, cell mount 60, and cell mount support plate 62 thereon while maintaining the ability to rotate these components to any angle between 0 and 90 degrees as discussed herein. According to one aspect, rotation mechanism 64 may be a standard rotary motor and encoder or other similar rotary device as dictated by the desired implementation. The operation of the rotation mechanism is discussed further below. According to one example, rotation mechanism 64 may be a precision rotary encoder operable to rotate the filter cell to any position between 0 and 90 degrees relative to the path of transmission beam 66 while providing precise positional measurements of the filter cell 58. Knowing the precise position of the encoder dictates that the precise angle of the filter cell 58 relative to the beam 66 is also know, which can then provide for a highly accurate calculation of the effect the angle of the filter cell 68 will have on the center wavelength of the beam 66. Put another way, knowing the accurate angle of the filter cell 58 allows the precise calculation of the shift in the center wavelength of the beam 66, as discussed further below. Thus, according to this example, the use of a precision encoder and motor as the rotation mechanism 64 allows precise tuning of the beam 66 to any desired frequency within the frequency band of interest. The opposite holds true as well, namely, knowing the desired center wavelength for beam 66 allows for precise determination of the required angle of filter cell 58 to induce the desired shift. The inclusion of a precision rotary encoder and motor as the rotation mechanism 64 then also allows for rotation of the transmit BPF 30 to a specific angle relative to the beam 66 path to induce the desired shift in the center wavelength.

According to one aspect, optical bench 10 may further include or utilize one or more feedback loops to provide corrective feedback to help reduce any residual errors caused by the operation of optical bench 10 and its components based on the installation environment and/or time in use thereof. For example, optical bench may employ one or more of self-testing transmit/receive loopback feedback; receiver operational feedback; and/or transmit operation feedback. Each of these types of feedback loops may provide data as to the position of the filter cell 58 relative to the beam 66, as well as to the center wavelength of the beam 66. If any error is found, this data may be used to offset or otherwise correct the factory calibration during normal operation.

Transmission pathway 12 may further include lone or more absorber or absorbent surface 32, which may be operable to absorb and stray or errant portions of beam 66 reflecting or otherwise traveling out of beam 66 path. According to one example, as the transmit BPF 30 rotates, small portions of beam 66 may be reflected away from the beam path, and absorber may capture these errant portion and may further help to prevent stray wavelength light from polluting the receiver pathway 14.

As mentioned above, PBS 34 may be shared in both the transmission and receiver pathways 12 and 14 in that it may encounter transmit beam 66 as it moves through and exits optical bench 10 but may also encounter receiver beam 68 as it enters and moves into receiver pathway 14. PBS may be any suitable optical splitter operable to allow certain wavelengths of light to pass therethrough (such as receiver beam 68) while reflecting other wavelengths (such as transmit beam 66). According to one aspect, PBS 34 may be a pellicle, a standard optical lens, an optical wedge, or any other optical component operable to perform as described herein. According to another aspect, PBS 34 may be further operable to allow the signal(s) to be multiplexed based on polarization.

As with PBS 34, LCVR 36 may be shared between the transmission and receiver pathways 12 and 14 in that it may also encounter both transmit beam 66 and receiver beam 68 during operation; however, in normal operation, the LCVR 36 only passively encounters receiver beam 68 and does not typically modify or change the beam 68 as it moves into optical bench 10. Put another way, LCVR 36 may be operated in the transmission pathway 12 but omitted from the receiver pathway 14 as dictated by the specific implementation thereof.

LCVR 36 may be a binary LCVR that is operable to control the phase to modify the polarization of transmit beam 66 and/or receiver beam 68, as desired. LCVR 36 may be an optional component as it is not required for functional operation of optical bench 10; however, if transmit BPF 30 is used to rotary tune or fine tune the transmission beam 66, it may also then be desirable to change or shift the polarization of the transmit signal 66 utilizing binary LCVR 36.

QWP 38 may also be shared in both the transmission and receiver pathways 12 and 14, or may be bypassed in one or both pathways 12 and 14 as needed. QWP 28 may work in conjunction with the LCVR 36 to allow complete control over the polarization of the transmit beam 66. According to one example, transmit beam 66 may be linearly polarized as it moves through the optical bench 10 and then may be converted to have a circular polarization as it passes through LCVR 36 and QWP 38 and is transmitted out and way from optical bench 10, as dictated by the desired implementation.

As mentioned above, the receiver pathway 14 may include one or more receiver BPFs 40 which may be substantially similar or identical to transmit BPF 30 in that receiver BPR 40 may likewise include a filter cell 58, a cell mount 60, a cell mount support plate 62, and a rotation mechanism 64.

Receiver BPF 40 may be operable to tune the filter bandpass for receiver beam 68 to any wavelength within the desired receiver frequency band and to filter out any wavelength light that is not the desired or target wavelength for receiver beam 68. This may help prevent pollution of the receiver pathway 14 by errant light from the receiver pathway 14 and may further allow the optical bench 10 to be tuned for greater sensitivity on the receiver pathway 14. As with transmit BPF 30, and as discussed in more detail below with regards to the operation thereof, receiver BPF 40 may be rotated to any angle between 0 and 90 degrees relative to the beam 68 path to tilt-tune the wavelength of the receiver beam 68. When the receiver BPF 40 is rotated to 0 degrees (i.e. orthogonal to the beam path 68—see, e.g. FIG. 2B), the beam 68 will have the exact required center wavelength relative to the desired receiver wavelength. When the receiver BPF 40 is rotated to 90 degrees (i.e. parallel to and entirely out of the beam path 68—see e.g. FIG. 2C), the receiver beam 68 will not be filtered and the receiver pathway 14 of optical bench will operate in the wideband frequency. As discussed further below, rotating the receiver BOF 40 to angles between 0 and 90 degrees will effectively shift the center wavelength of the beam 68 to other frequencies within the desired receiver frequency band. As with transmit BPF 30, and according to one aspect, a smaller range of rotation may likewise be used to tune the passband of the beam 68 for operation in the desired frequency band. For example, where the frequency band of interest is the C-band the angle of rotation may be 0-15 degrees for operational tuning, while 90 degrees may still be used to remove the receiver BPF 40 from the beam 68 path.

Etalon filter 42 may be substantially similar to transmit BPF 30 and/or receiver BPF 40 in that it may be a mounted filter in conjunction with a rotation mechanism 64 to allow rotational movement and adjustment to the filter position as discussed further below. Etalon filter 42 may differ from receiver BPF 40 and/or transmit BPF 30 in that the filter cell 58 itself may be an etalon filter cell to allow for extremely narrowband filtration of the receiver signal 68 as discussed further below. Etalon filter 42 may be further operable and/or beneficial when filtering out direct sunlight such as when the sun itself is in the field of view of optical bench 10. In instances where it is not required, etalon filter 42 may be rotated out of the receiver pathway 14 as desired. If wideband receiver operation is desired, etalon filter 42 may be rotated out of the receiver pathway 14 along with receiver BPF 40, thus allowing the wideband operation of optical bench 10 along the receiver pathway 14.

According to one example, similar to transmit BPF 30, the rotation mechanisms 64 for receiver BPF 40 and etalon filter 42 may be precision rotary encoders which may allow for the accurate and precise calculation of the degree of shift in the center wavelength of receiver beam 68, and vice versa, as discussed herein. Similarly, receiver pathway 12 may utilize one or more feedback loops to ensure precise positioning and angling of receiver BPF 40 and/or etalon filter 42 over time and during normal operation of optical bench 10, as discussed previously herein.

Continuous LCVR 44 may be any suitable LCVR operable to adjust or modify the polarization of the receiver signal 68 to control the amount of light directed down the receiver communications pathway 16 and the ATS pathway 18 through a polarizing beam splitter 46. Continuous LCVR 44 may be operable to adjust the polarization of all or part of the receiver signal 68 to adjust or otherwise determine the percentage of light traveling down each pathway 16 and/or 18.

For example, continuous LCVR 44 may permit any percentage of light to go down either pathway 16 and/or 18 such as 100 percent of the light going down the ATS path 18, 50 percent of the light going down each pathway 16 and 18, or any other suitable distribution depending upon the dictated use and specific operation of optical bench 10 at the moment at which receiver beam 68 encounters continuous LCVR 44. According to another aspect, continuous LCVR 44 is considered continuous in that it may adjust these percentages in real-time allowing for a fluid and dynamic determination and change to the amount of light traveling down each pathway 16 and/or 18.

As with transmit PBS 34, receiver PBS 46 may be any suitable or standard polarizing beam splitter operable to multiplex the receiver signal 68 and split the signal down each of the previously mentioned pathways 16 and/or 18.

As mentioned above, receiver communications pathway 16 may further include one or more receiver communications alignment wedge pairs 48, which may be any suitable or standard wedge pair or similar steering optics as dictated by the desired implementation. Receiver communications pathway 16 may additionally include a receiver communication collimator 50 and optical amplifier 52. Receiver collimator 50 may be substantially similar to transmit collimator 26 but may operate in the reverse in that receiver collimator 50 may take the receiver beam 68 moving through free space and collimate it down for transmission by optical fiber to the low noise amplifier 52, which may be operable to take the lower powered receiver signal 68 and amplify it up to a usable power level for further processing by the communications system.

As mentioned above, ATS pathway 18 may include one or more alignment wedge pairs 54 which may be standard optical wedges operable to steer or otherwise direct beam 68 within the optical bench 10. Wedge pair 54 may be aligned to steer the portion of the beam 68 from the continuous LCVR 44 traveling down the ATS pathway 18. According to one aspect, ATS alignment wedge pair 54 may direct at least a portion of receiver signal 68 to the acquisition and tracking sensor 56, which may be any suitable acquisition and tracking sensor. According to one aspect, acquisition and tracking sensor 56 may be a shortwave, infrared acquisition focal plane sensor utilizing silicone optics in the sensor path with narrowband filtering. According to another aspect, sensor 56 may be any suitable acquisition sensor as contemplated for use with optical signals allowing for tracking and alignment of optical bench according to the desired implementation. For example, acquisition and tracking sensor may be utilized to align optical bench 10 with known locations or points, such as celestial targets, to then properly position and align optical bench 10 in the appropriate position for the desired operation thereof.

Having thus described the elements and components of optical bench 10, the operation and use thereof will be further described in more detail.

With reference to FIGS. 2A-2C, most of the components and elements of optical bench 10 may be standard or commercially available optical components and may be operated or used according to their known and expected function. However, as described previously herein, most optical benches utilized in optical or laser communications operate having filters that are fixed at a certain frequency or alternatively, filters operated on a flipper mechanism to allow both wide and narrowband operations. Systems operating on fixed filters are typically limited to either wide or narrowband operation alone, while systems utilizing flipper mechanisms may be alternated between narrow and wideband; however, these systems are limited in that they may have, at most, two alternating states. Specifically, these systems may be limited to narrowband operation, with the filter flipped into the beam path, or wideband, with the filter removed from the beam path. The particular operational frequencies are set by the present or absence of the filter within the beam path and are not tunable or otherwise able to be precision angle tuned to shift the optical signal wavelength. This imparts rigidity into current systems which may further result in transmission and receiver crosstalk, and/or self-interference.

As discussed previously herein, optical bench 10 may differ in the utilization of rotary stage BPFs 30 and 40, and/or etalon rotary stage filter 42. In particular, each of these filters may generally have a similar construction and may generally resemble the filter indicated in FIG. 2A as filter 30, 40, and 42 in that the construction may be substantially identical (with the exception that the specific filter cell 58 may vary as dictated by the desired implementation, as well as based on the position within the optical bench—e.g. filter cell 58 may vary between transmit BPF30 and receiver BPF 40, etc.). It will be therefore understood that this exemplary illustration applies equally to all filters 30, 40, and/or 42, unless specifically stated otherwise.

With continued reference to FIGS. 2B and 2C, but with additional reference to FIG. 1, exemplary positioning of rotary filters is shown and may be described with reference to the transmit beam 66 and receiver beam 68 (which are generally shown in exemplary form). Generally shown therein is a filter (30, 40, and/or 42) which may be located between two neighboring optical elements which may vary depending upon the specific implementation. For example, transmit BPF 30 may be between wedge pair 28 and PBS 34, which receiver BPF 40 may be between PBS 34 and etalon filter 42. Thus, as illustrated therein, the neighboring components are generally shown as representative of relative position and not as limiting examples of the specific components adjacent the filter 30, 40, and/or 42 on either side thereof.

As shown then in FIG. 2B, filter 30, 40, and/or 42 may be rotated by the precision rotation mechanism 64, which, according to this example, may be a rotary motor and a rotation position encoder with 0.01 degree resolution and 0.03 degree repeatable/accuracy. Rotation mechanism 64 may be operable to rotate the filter 30, 40, and/or 42 from 0 to 90 degrees to any position between a first position, wherein filter 30, 40, and/or 42 is orthogonal to the path of beam 66, 68 (i.e. 0°—as shown in FIG. 2B) and a second position wherein filter 30, 40, and/or 42 is completely removed from the path of receiver beam 68 (i.e. 90°—as shown in FIG. 2C). This rotational movement is indicated by the movement arrow A in FIG. 2C.

As discussed herein, this rotational ability may not only provide for narrowband filtering when the filter 30, 40, and/or 42 is within the path of beam 66, 68 but also wideband operation when filter 30, 40, and/or 42 is removed from the beam path 66, 68. Further, the ability to angle tune the filter 30, 40, and/or 42 to any position between 0 and 90 degrees to adjust the center wavelength of the signal passband to alternate frequencies to avoid crosstalk, allow the system to switch between low wavelength configurations, and to further allow the optical bench 10 to tune the operational center wavelength to alternate between multiple frequencies utilizing a single system. This may provide further flexibility in both avoiding crosstalk and in compatibility with other remote optical communications systems as the transmit and receiver pathways 12 and 14 are not limited to single frequency use.

Figure 3A:
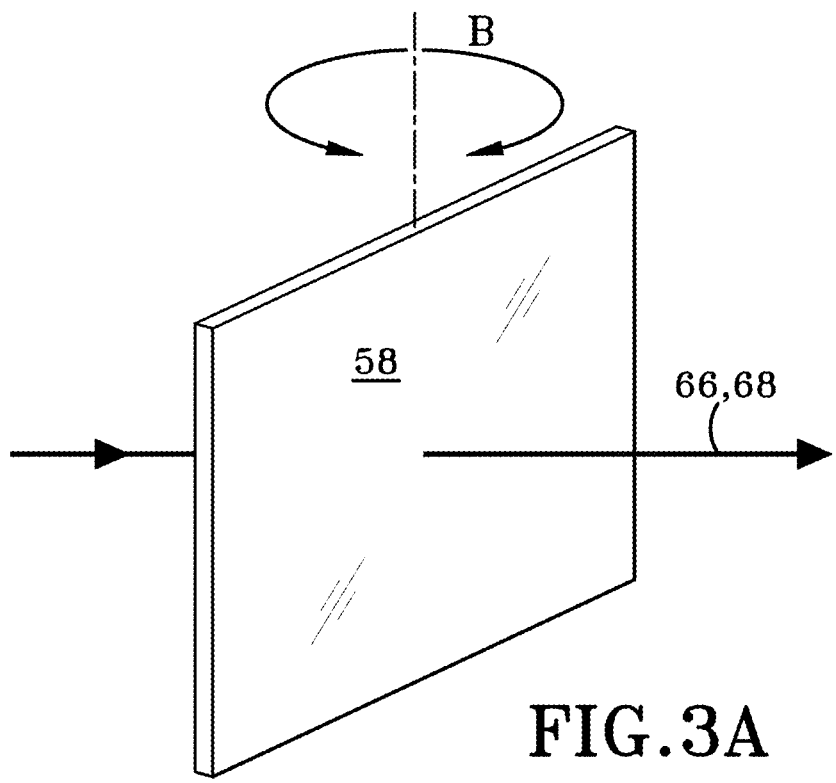
FIG. 3A (FIG. 3A) is a conceptual illustration of the angle tuning of an optical bandpass filter, according to one aspect of the present disclosure.
Figure 3B:
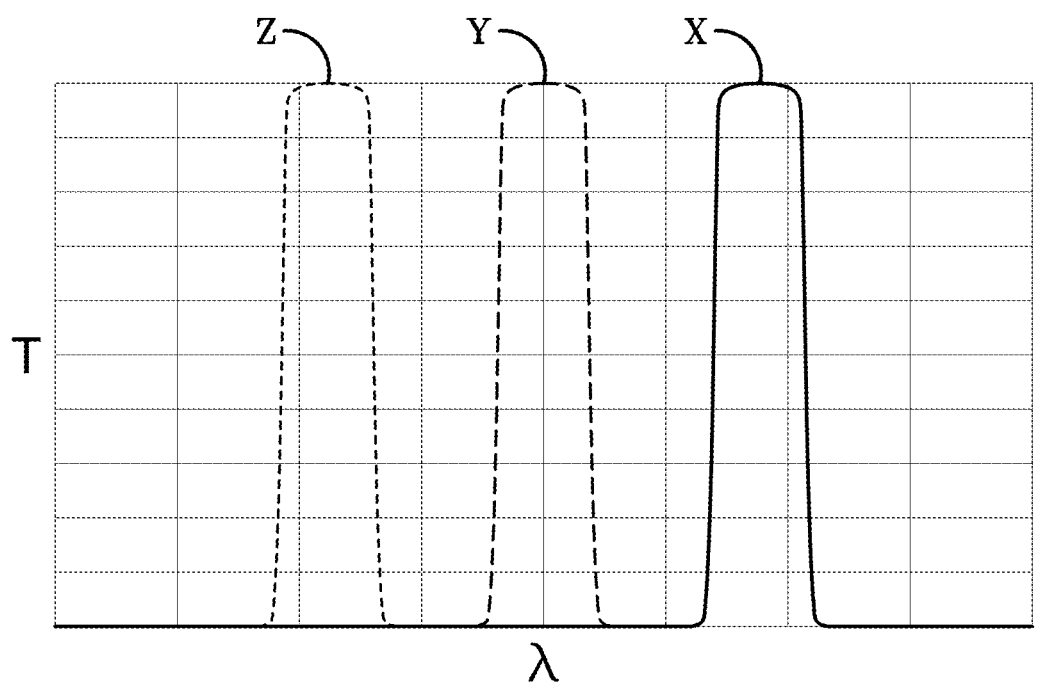
FIG. 3B (FIG. 3B) is a graphical representation of the corresponding shift in the center wavelength of the narrow passband resulting from the angle tuning of the optical bandpass filter from FIG. 3A, according to one aspect of the present disclosure.

With reference to FIGS. 3A and 3B, and with continued reference to FIG. 1, the concept of using an optical bench 10 having rotary stage transmit PBF 30, receiver BPF 40, and etalon filters 42 to provide precision angle tuning of the transmission beam 66 and receiver beam 68 to switch or otherwise shift the beams within a desired frequency band is illustrated in FIG. 3A utilizing an exemplary filter cell 58. The arrow passing through is representative of one of the transmission beam 66 and the receiver beam 68. As indicated by arrow B, the filter cell 58 may be rotated in either direction, which may cause a shift in the center wavelength of the desired frequency band. The rotation of filter cell 58 to any position between 0 and 90 degrees allows full tunability in that the center wavelength of beam 66 or 68 may be shifted to any frequency within the desired frequency band.

This shift is shown generally and conceptually in the graph in FIG. 3B. Specifically, FIG. 3B illustrates the level of transmission or transmissibility of a particular wavelength through filter cell 58. The reference character "T" on the y-axis represents the transmissibility or transmission rate of each wavelength through the filter cell 58. The "A" symbol on the x axis then represents the wavelength of the beam 66, 68 moving through the filter cell 58.

As shown, a first center wavelength is indicated at reference X, representing the frequency with the highest center wavelength transmissibility. This peak wavelength X may then shift across the frequency band as the filter cell 58 is rotated in one direction (for example, clockwise), as represented by subsequent center wavelengths at references Y and Z. As the filter cell 58 continues to rotate in the same direction, the center wavelength of the beam 66 or 68 will continue to shift until the filter cell 58 is rotated out of the beam 66 or 68 path (e.g. when the cell 58 is 90 degrees relative thereto).

In particular, when the filter cell 58 is at 0 degrees (i.e. the optical beam 66 or 68 hits the filter cell 58 with normal incidence) the passband will be at its longest center wavelength (position X in FIG. 3B). As the filter cell 58 is rotated to higher angles of incidence, the center wavelength of the passband will shorten (i.e. move to the left on the plot of FIG. 3B, again as represented at references Y and Z). As mentioned above, the range of tuning angles for filter cell 58 may be less than the full range from 0-90 degrees. According to one example, where the region of interest is C-band, the range of rotation may be 0-15 degrees. The rotation mechanism 64 also provides the ability to rotate the filter cell 58 to the 90 degree position and out of the path of beams 66 and/or 68 for wideband (i.e. no filter) operation.

Once the filter cell 58 is out of the beam 66, 68 path, the full spectrum of the frequency band is available and the optical bench 10 may operate in wideband. If the direction of rotation of the filter cell 58 is reversed (e.g. counterclockwise), the filter cell 58 will again move into the path of beam 66 or 68 and the center wavelength will shift in the opposite direction, back to the first position/first center wavelength X, which may represent the exact required center wavelength relative to the desired wavelength of beam 66 or 68 (i.e. the center wavelength when the filter cell 58 is at 0 degrees and perpendicular to the path of beam 66 or 68).

The etalon filter 42 may operate similarly; however, it will be understood that the etalon filter 42 may have an extremely narrow operational frequency band for extreme narrowband filtering. According to one example, this extremely narrowband filtering is beneficial when the optical bench 10 is oriented such that the solar disc (i.e. the sun) is directly in the field of view of the optical bench. Where the operation of optical bench 10 does not require this extremely narrow filtering provided by etalon filter 42, the etalon filter 42 may be rotated 90 degrees and out of the path of receiver beam 68 while the transmit BPF 30 and receiver BPF 40 may operate normally as described herein. Alternatively, in implementations where the extreme narrowband filtering provided by the etalon filter 42 is not required or desirable, etalon filter 42 may be omitted from optical bench 10 entirely.

Figure 4:
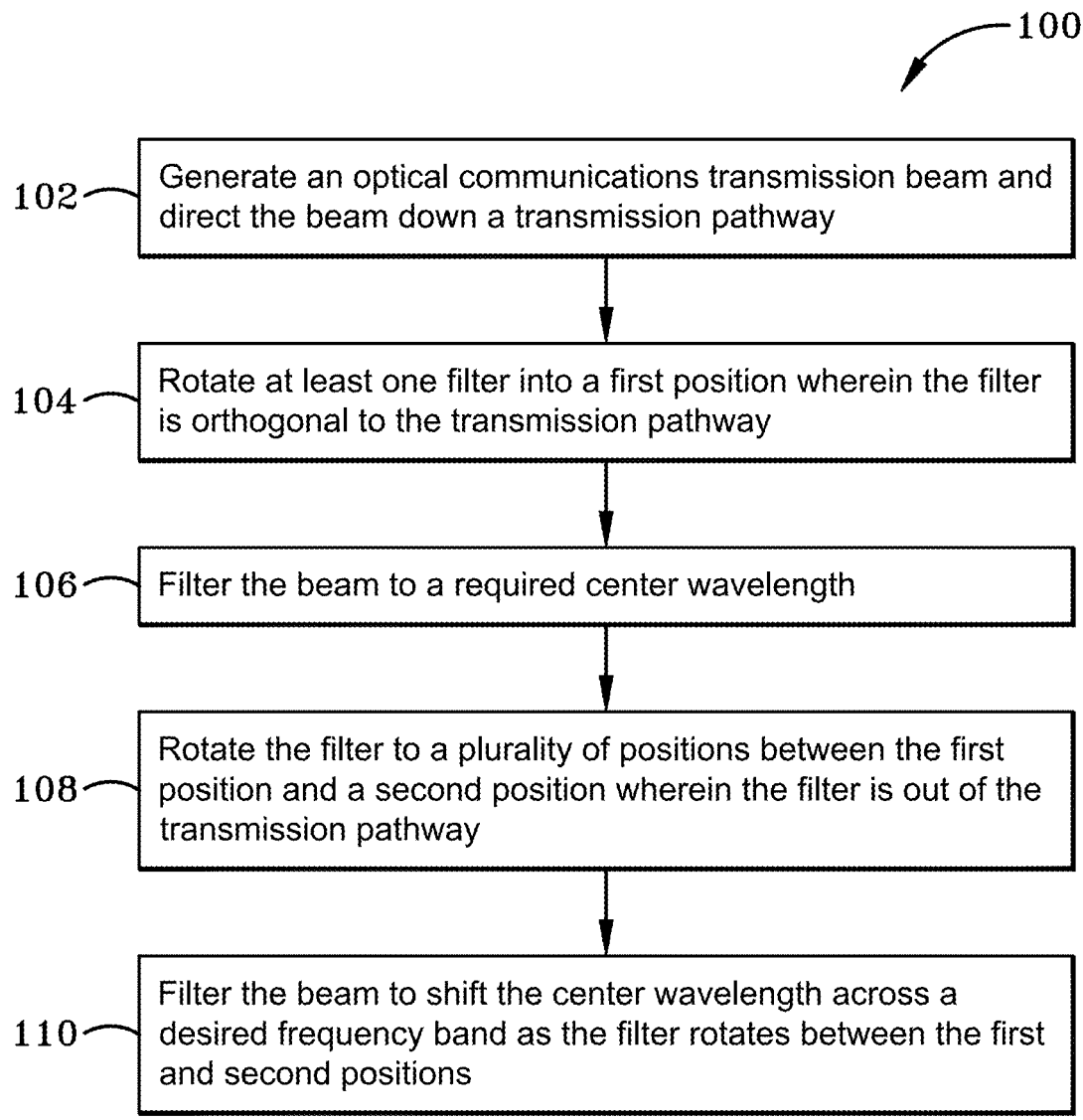
FIG. 4 (FIG. 4) is an operational flowchart depicting a method of use for an optical bench including one or more precision rotary optical filters thereupon.

With reference to FIG. 4, the operation of an exemplary transmission pathway 12 of an exemplary optical bench 10 is illustrated by way of an operational flow chart as process 100. First, at reference 102 in process 100, the optical bench 10 may generate an optical communications transmission beam 66 from the one or more laser generators 20 and may further direct that beam 66 down the transmission pathway 12 with the various components previously described herein.

As transmission beam 66 move down the transmission pathway 12, the transmit BPF 30 may be rotated into the beam 66 path to the first position wherein the filter cell 58 is orthogonal to the beam 66 path. In this first position, the beam 66 may be filtered to have the exact required center wavelength, as discussed above. Rotating the transmit BPF 30 into the first position is indicated at reference 104 in process 100 while filtering the beam 66 to the required center wavelength is show at reference 106.

During the ongoing operation of the transmission pathway 12 of optical bench 10, the transmit BPF 30 and filter cell 58 may be rotated to any of a plurality of positions or angles between the first position and the second position wherein the filter is out of the transmission beam 66 path. The act of rotating the transmit BPF 30 and filter cell 58 to the plurality of positions is indicated at reference 108 in process 100.

Next, as indicated at reference 110, as the transmit BPF 30 and filter cell 58 rotate through the plurality of positions, the center wavelength of the beam will shift across the desired frequency band of interest, as described previously herein.

Although not shown in FIG. 4, it will be understood that the operation of the receiver BPF 40 and/or etalon filter 42 may be similarly implemented, as discussed previously herein.

While discussed previously herein as an optical bench for use in optical or laser communications, it will be further understood that these are exemplary uses of optical bench 10 utilizing rotary stage transmit BPF 30, rotary stage receiver BPF 40, and/or rotary staged etalon filter 42 and optical bench 10 may be readily adapted for use in other optical and/or laser transmission systems, or any other suitable transmission systems. According to one aspect, some common applications that may benefit from the concepts described herein may include satellite communications between satellites in orbit, low earth orbit communications between a low earth orbit satellite and a ground or terrestrial-based installation, as well as in other terrestrial-based or space-based applications as desired. Accordingly, it will be understood that the specific operational perimeters including the desired and/or specific wavelengths being utilized both in laser generation by laser generators 20, and in operation and rotation of the filters 30, 40, and/or 42 may vary depending upon the specific implementation and operational requirements of optical bench 10. However, the use of rotary stage BPFs 30 and 40 and etalon filter 42 may enable or otherwise permit switchable modes between narrow and wideband filtering of the optical pathways along with precise tunable narrowband filtering. This may further allow operational flexibility by precise tilt-tuning of the filters 30, 40 and/or 42 while simultaneously improving manufacturability by relaxing tolerances on the filters and by allowing for further automation of filter alignment. This further represents a marked improvement over fixed filter systems and/or systems utilizing a flipper mechanism to switch between narrow and wideband filtering of the optical path.

As described herein, aspects of the present disclosure may include one or more electrical, pneumatic, hydraulic, mechanical, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any mechanical actuators may include any secondary or peripheral components such as piezoelectric, gears, electrical motors, switches, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A laser communications optical bench comprising:
    at least one generator operable to generate an optical communications transmission beam at a first frequency along a transmission pathway;
    a rotation mechanism; and
    a filter carried by the rotation mechanism;
    at least one receiver operable to receive an optical communications receiver beam from outside of the optical bench along a receiver pathway;
    a second rotation mechanism; and
    a second filter carried by the second rotation mechanism within the receiver pathway;
    wherein the rotation mechanism is operable to rotate the filter to any desired position between a first position wherein the filter is substantially orthogonal to the transmission pathway and a second position wherein the filter is substantially parallel to and out of the transmission pathway, and wherein the filter is further operable to shift a center wavelength frequency of the transmission beam within a desired frequency band as it rotates between the first position and the second position; and
    wherein the second rotation mechanism is operable to rotate the second filter to any desired position between a first position wherein the second filter is substantially orthogonal to the receiver pathway of the receiver beam and a second position wherein the second filter is substantially parallel to and out of the receiver pathway of the receiver beam, and wherein the second filter is further operable to shift a center wavelength frequency of the receiver beam within a desired frequency band as it rotates between the first position and the second position.

2. The laser communications optical bench of claim 1 wherein the transmission pathway of the optical bench operates in a narrowband mode when the filter is in any position within the transmission pathway and the transmission pathway of the optical bench operates in a wideband mode when the filter is in the second position and out of the transmission pathway.

3. The laser communications optical bench of claim 1 further comprising:
    a third rotation mechanism; and
    a third filter carried by the third rotation mechanism within the receiver pathway;
    wherein the third rotation mechanism is operable to rotate the third filter to any desired position between a first position wherein the third filter is substantially orthogonal to the receiver pathway of the receiver beam and a second position wherein the third filter is substantially parallel to and out of the receiver pathway of the receiver beam, and wherein the third filter is further operable to shift a center wavelength frequency of the receiver beam within a desired frequency band as it rotates between the first position and the second position.

4. The laser communications optical bench of claim 3 wherein the rotation mechanism, the second rotation mechanism, and the third rotation mechanism each further comprise:
    a rotation motor and position encoder.

5. The laser communications optical bench of claim 3 wherein the third filter further comprises:
    an etalon filter.

6. The laser communications optical bench of claim 5 wherein the etalon filter is operable to reduce interference caused by a solar disc when the solar disc is within a field of view of the optical bench.

7. The laser communications optical bench of claim 1 wherein the receiver pathway further comprises:
    a receiver communications pathway; and
    an acquisition and tracking sensor pathway.

8. The laser communications optical bench of claim 7 further comprising:
    at least one polarizing beam splitter operable to direct at least a portion of the receiver beam down the receiver communications pathway and at least another portion of the receiver beam down the acquisition and tracking pathway.

9. The laser communications optical bench of claim 1 wherein the receiver pathway of the optical bench operates in a narrowband mode when the second filter is in any position within the receiver pathway and the receiver pathway of the optical bench operates in a wideband mode when the second filter is in the second position and out of the receiver pathway.

10. A method of tuning a laser communications optical beam comprising:
    generating an optical communications transmission beam from at least one beam generator;
    directing the transmission beam down a transmission pathway in an optical bench;
    rotating a filter to a first position wherein the filter is substantially orthogonal to the transmission pathway;
    filtering the transmission beam with a filter to have a required center wavelength relative to a desired wavelength of the transmission beam;
    rotating the filter to a second position wherein the filter is substantially parallel to and out of the transmission pathway and the transmission beam is not filtered;
    operating the transmission pathway of the optical bench in a wideband mode when the filter is in the second position; and
    receiving an optical communications receiver beam from outside of the optical bench along a receiver pathway;
    directing the receiver beam down the receiver pathway;
    rotating a second filter to a first position wherein the second filter is substantially orthogonal to the receiver pathway;
    filtering the receiver beam with the second filter to have a required center wavelength relative to a desired wavelength of the receiver beam;

rotating the second filter to a second position wherein the second filter is substantially parallel to and out of the receiver pathway and the receiver beam is not filtered; and operating the receiver pathway of the optical bench in a wideband mode when the second filter is in the second position.

11. The method of claim 10 further comprising:

rotating the filter to a plurality of positions between the first position and the second position; and filtering the transmission beam with the filter to shift the center wavelength of the transmission beam across a frequency band as the filter rotates through each position of the plurality of positions between the first position and the second position.

12. The method of claim 10 further comprising:

rotating the second filter to a plurality of positions between the first position and the second position; and filtering the receiver beam with the second filter to shift the center wavelength of the receiver beam across a frequency band as the second filter rotates through each position of the plurality of positions between the first position and the second position.

13. The method of claim 12 wherein rotating the filter in the transmission pathway and the rotating of the second filter in the receiver pathway is accomplished via a first rotation motor and position encoder and a second rotation motor and position encoder, respectively.

14. The method of claim 12 further comprising:

rotating a third filter to a first position wherein the third filter is substantially orthogonal to the receiver pathway;

filtering the receiver beam with the third filter to reduce interference from a solar disc when the solar disc is in a field of view of the optical bench; and rotating the third filter to a second position wherein the third filter is substantially parallel to and out of the receiver pathway and the receiver beam is not filtered by the third filter.

15. The method of claim 14 wherein rotating the third filter is accomplished via a third rotation motor and position encoder.

* * * * *